US012764060B2

(12) United States Patent
Yan

(10) Patent No.: US 12,764,060 B2
(45) Date of Patent: Oct. 13, 2026

(54) METHOD AND DEVICE FOR FORWARDING DATA FLOW, SDN CONTROLLER AND STORAGE MEDIUM

(71) Applicant: New H3C Technologies Co., Ltd., Hangzhou (CN)

(72) Inventor: Feng Yan, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 43 days.

(21) Appl. No.: 18/965,522

(22) Filed: Dec. 2, 2024

(65) Prior Publication Data

US 2025/0310243 A1 Oct. 2, 2025

(30) Foreign Application Priority Data

Mar. 26, 2024 (CN) ......................... 202410354715.0

(51) Int. Cl.
*H04L 45/24* (2022.01)

(52) U.S. Cl.
CPC .................................... *H04L 45/24* (2013.01)

(58) Field of Classification Search
CPC ......... H04L 45/24; H04L 45/16; H04L 45/76; H04L 45/036
See application file for complete search history.

(56) References Cited

U.S. PATENT DOCUMENTS

2019/0245775 A1* 8/2019 Chen ..................... H04L 45/036
2020/0314128 A1* 10/2020 Hild .................... H04L 63/1416
2022/0173980 A1* 6/2022 Yoon ...................... G06N 20/00
2022/0247643 A1* 8/2022 Dechene ............... H04L 41/122
2023/0124947 A1* 4/2023 Mermoud ........... H04L 43/0876 709/224
2024/0187122 A1* 6/2024 Pandey .................. H04L 41/12

FOREIGN PATENT DOCUMENTS

EP 3754915 B1 4/2022

OTHER PUBLICATIONS

Extended European Search Report issued in corresponding European Application No. 24216501.7, dated Apr. 29, 2025.

* cited by examiner

*Primary Examiner* — Mohamed A. Wasel
(74) *Attorney, Agent, or Firm* — NORTON ROSE FULBRIGHT US LLP

(57) ABSTRACT

Provided are a method and a device for forwarding a data flow, an SDN controller and a storage medium. The method is applied to the SDN controller, and includes: acquiring task information of an AI training task, wherein the task information comprises a communication model of the AI training task, an address of a source task node and an address of a destination task node; selecting a forwarding path between the source task node and the destination task node based on topology information of a network and the communication model; configuring a forwarding flow table to each forwarding node on the forwarding path, causing the each forwarding node to forward a data flow of the AI training task from the source task node to the destination task node along the forwarding path based on the forwarding flow table.

12 Claims, 7 Drawing Sheets

METHOD AND DEVICE FOR FORWARDING DATA FLOW, SDN CONTROLLER AND STORAGE MEDIUM

CROSS-REFERENCE TO RELATED APPLICATIONS

This application claims the benefit of priority to Chinese Patent Application No. 202410354715.0 filed on Mar. 26, 2024, which is incorporated herein by reference in its entirety.

TECHNICAL FIELD

The present disclosure relates to the technical field of communication, in particular to method and a device for forwarding a data flow, an SDN controller and a storage medium.

BACKGROUND

At present, there is an increasing demand for large-scale training of Artificial Intelligence (AI) models in the industry, which puts forward a new requirement for performance of a data center network supporting a basic training. The number of data flows of AI training tasks in AI model is small, but traffic throughput is high. A forwarding node in the data center network forwards the data flows of AI training tasks by using an existing traffic balance mechanism, which easily leads to traffic imbalance on links, and further reduces the network throughput and therefore leads to the poor performance of AI cluster service.

SUMMARY

The example of the present disclosure aims to provide a method and a device for forwarding a data flow, an SDN controller and a storage medium, to realize a traffic balance on whole network links, improve the network throughput and improve the performance of the AI cluster service. The specific technical solution is as follows:

In a first aspect, an example of the present disclosure provides a method for forwarding a data flow, applied to a Software Defined Network (SDN) controller, and the method includes:

acquiring task information of an AI training task, wherein the task information includes a communication model of the AI training task, an address of a source task node and an address of a destination task node, and the communication model is to indicate an AI training data transferring relationship between the source task node and the destination task node;

selecting a forwarding path between the source task node and the destination task node based on topology information of a network and the communication model;

configuring a forwarding flow table to each forwarding node on the forwarding path, causing the each forwarding node to forward a data flow of the AI training task from the source task node to the destination task node along the forwarding path based on the forwarding flow table.

In some examples, acquiring the task information of the AI training task includes:

acquiring the task information of the AI training task from a computing resource scheduling platform, wherein the task information is information acquired by the computing resource scheduling platform from a server carrying the AI training task, and the server includes one or more task nodes therein; or acquiring the task information of the AI training task from a server carrying the AI training task, wherein the server includes one or more task nodes therein; or displaying a control interface of the SDN controller; receiving the task information of the AI training task which is input from outside to the SDN controller via the control interface.

In some examples, the AI training data transferring relationship between the source task node and the destination task node is a point-to-multipoint transferring relationship, or, the AI training data transferring relationship between the source task node and the destination task node is a multi-point-to-multipoint transferring relationship;

selecting the forwarding path between the source task node and the destination task node based on the topology information of the network and the communication model, includes:

determining a first forwarding node corresponding to a plurality of the destination task nodes based on the topology information of the network, wherein a length sum of paths from the first forwarding node to the plurality of the destination task nodes is smaller than a length sum of paths from any other forwarding node to the plurality of the destination task nodes;

selecting a first path between each source task node and the first forwarding node and selecting a second path between the first forwarding node and each destination task node based on the topology information of the network, wherein the first path corresponding to each source task node and the second path corresponding to each destination task node compose a forwarding path between this source task node and this destination task node;

configuring the forwarding flow table to each forwarding node on the forwarding path, includes:

configuring a corresponding multicast flow table to each forwarding node on a forwarding path corresponding to each source task node, wherein a destination address of the multicast flow table is an address of a multicast group formed by the plurality of the destination task nodes.

In some examples, the topology information includes a topology structure, a link state and a utilization rate of link bandwidth;

selecting the first path between each source task node and the first forwarding node and selecting the second path between the first forwarding node and each destination task node based on the topology information of the network, includes:

selecting, based on the topology structure, the link state and the utilization rate of link bandwidth, the first path with a lowest load between each source task node and the first forwarding node, and selecting the second path with a lowest load between the first forwarding node and each destination task node.

In some examples, the method further includes:

collecting the topology information of the network in real time by using a telemetry technology.

In some examples, the forwarding flow table is a routing table, a policy routing table or an OpenFlow flow table.

In a second aspect, an example of the present disclosure provides a device for forwarding a data flow, applied to an SDN controller, the device includes:

an acquisition module, to acquire task information of an AI training task, wherein the task information includes a communication model of the AI training task, an address of a source task node and an address of a destination task node, and the communication model is to indicate an AI training data transferring relationship between the source task node and the destination task node;

a selection module, to select a forwarding path between the source task node and the destination task node based on topology information of a network and the communication model;

a configuring module, to configure a forwarding flow table to each forwarding node on the forwarding path, causing each forwarding node to forward a data flow of the AI training task from the source task node to the destination task node along the forwarding path based on the forwarding flow table.

In some examples, the acquisition module is to:

acquire the task information of the AI training task from a computing resource scheduling platform, wherein the task information is information acquired by the computing resource scheduling platform from a server carrying the AI training task, and the server includes one or more task nodes therein; or acquire the task information of the AI training task from a server carrying the AI training task, wherein the server includes one or more task nodes therein; or display a control interface of the SDN controller; receive the task information of the AI training task which is input from outside to the SDN controller via the control interface.

In some examples, the AI training data transferring relationship between the source task node and the destination task node is a point-to-multipoint transferring relationship, or, the AI training data transferring relationship between the source task node and the destination task node is a multipoint-to-multipoint transferring relationship;

the selection module is to:

determine a first forwarding node corresponding to a plurality of the destination task nodes based on the topology information of the network, wherein a length sum of paths from the first forwarding node to the plurality of the destination task nodes is smaller than a length sum of paths from any other forwarding node to the plurality of the destination task nodes;

select a first path between each source task node and the first forwarding node and selecting a second path between the first forwarding node and each destination task node based on the topology information of the network, wherein the first path corresponding to each source task node and the second path corresponding to each destination task node compose a forwarding path between this source task node and this destination task node;

the configuring module is to:

configure a corresponding multicast flow table to each forwarding node on a forwarding path corresponding to each source task node, wherein a destination address of the multicast flow table is an address of a multicast group formed by the plurality of the destination task nodes.

In some examples, the topology information includes a topology structure, a link state and a utilization rate of link bandwidth;

the selection module is to select, based on the topology structure, the link state and the utilization rate of link bandwidth, the first path with a lowest load between each source task node and the first forwarding node, and select the second path with a lowest load between the first forwarding node and each destination task node.

In some examples, the device further includes:

a collection module, to collect the topology information of the network in real time by using a telemetry technology.

In some examples, the forwarding flow table is a routing table, a policy routing table or an OpenFlow flow table.

In a third aspect, an example of the present disclosure provides an SDN controller including a processor and a machine-readable storage medium having a machine-executable instruction stored therein that can be executed by the processor, wherein the machine-executable instruction causes the processor to carry out any one of the above methods.

In a fourth aspect, an example of the present disclosure provides a computer-readable storage medium having a computer program stored therein, wherein the computer program, when executed by a processor, carries out any one of the above methods.

An example of the present disclosure further provides a computer program product containing an instruction, which, when runs on a computer, causes the computer to carries out any one of the above methods.

The beneficial effect achieved by the examples of the present disclosure:

In the technical solutions provided by the examples of the present disclosure, the SDN controller selects the forwarding path between the source task node and the destination task node in combination with the topology information of the network and the task information of the AI training task, and then configures a forwarding flow table indicating that the data flow of the AI training task is forwarded along the forwarding path. In this way, the forwarding node relies on the forwarding flow table to forward the data flow of the AI training task. Because the SDN controller has a global perspective of network managing and controlling, the SDN controller can select a forwarding path that can achieve load balance to forward the data flow of the AI training task by combining the topology information of the network and the task information, thus realizing the traffic balance on the whole network links, thus improving the network throughput and improving the performance of AI cluster service.

Of course, it is not necessary to achieve all the advantages mentioned above at the same time by implementing any product or method of the present disclosure.

BRIEF DESCRIPTION OF THE DRAWINGS

In order to explain the examples of the present disclosure or the technical scheme in the prior art more clearly, the drawings needed to be used in the description of the examples or the prior art will be briefly introduced below. Obviously, the drawings in the following description are only some examples of the present disclosure, and other examples can be obtained based on these drawings for ordinary people in the field.

Figure 3A:
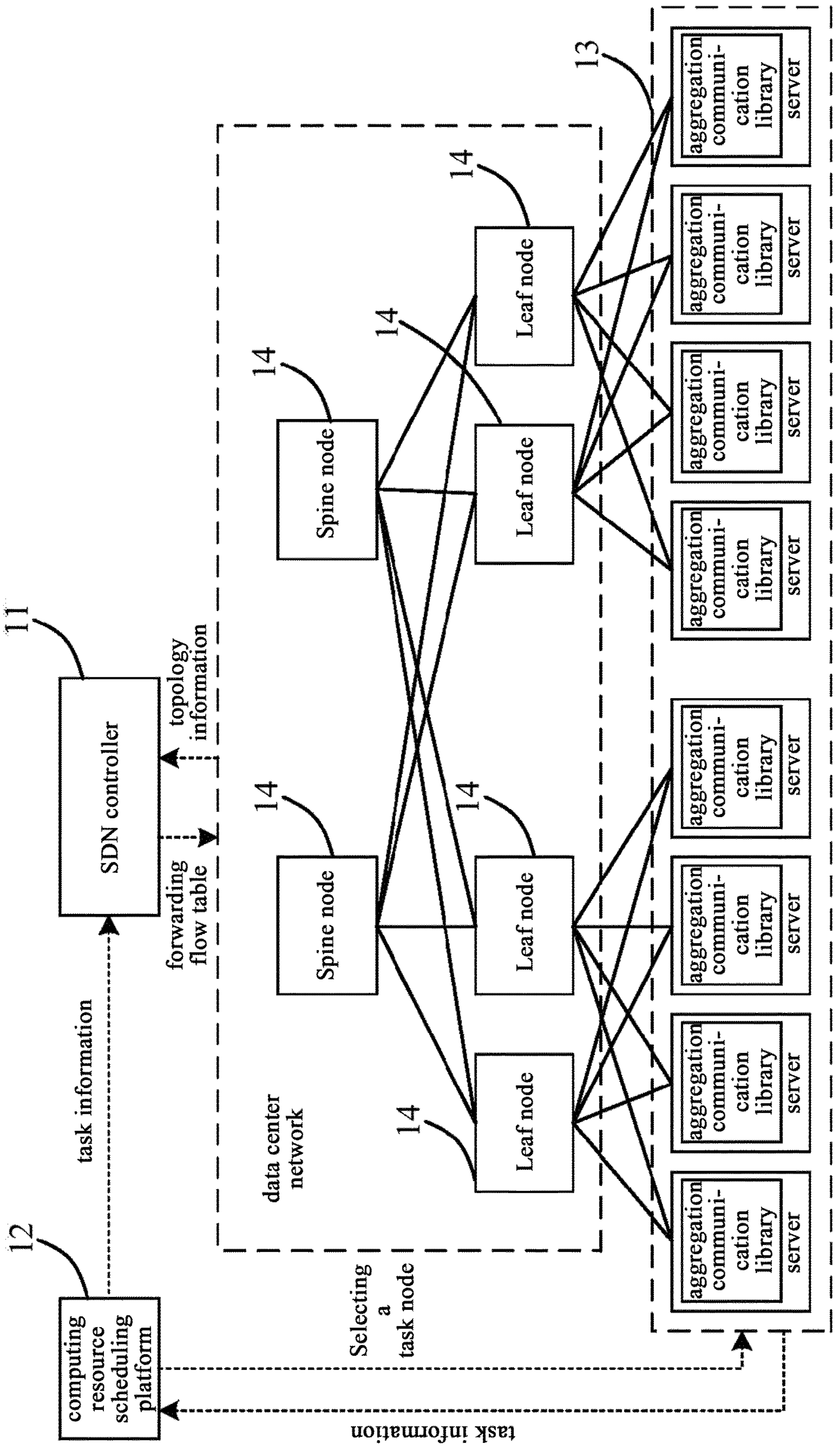
Figure 3B:
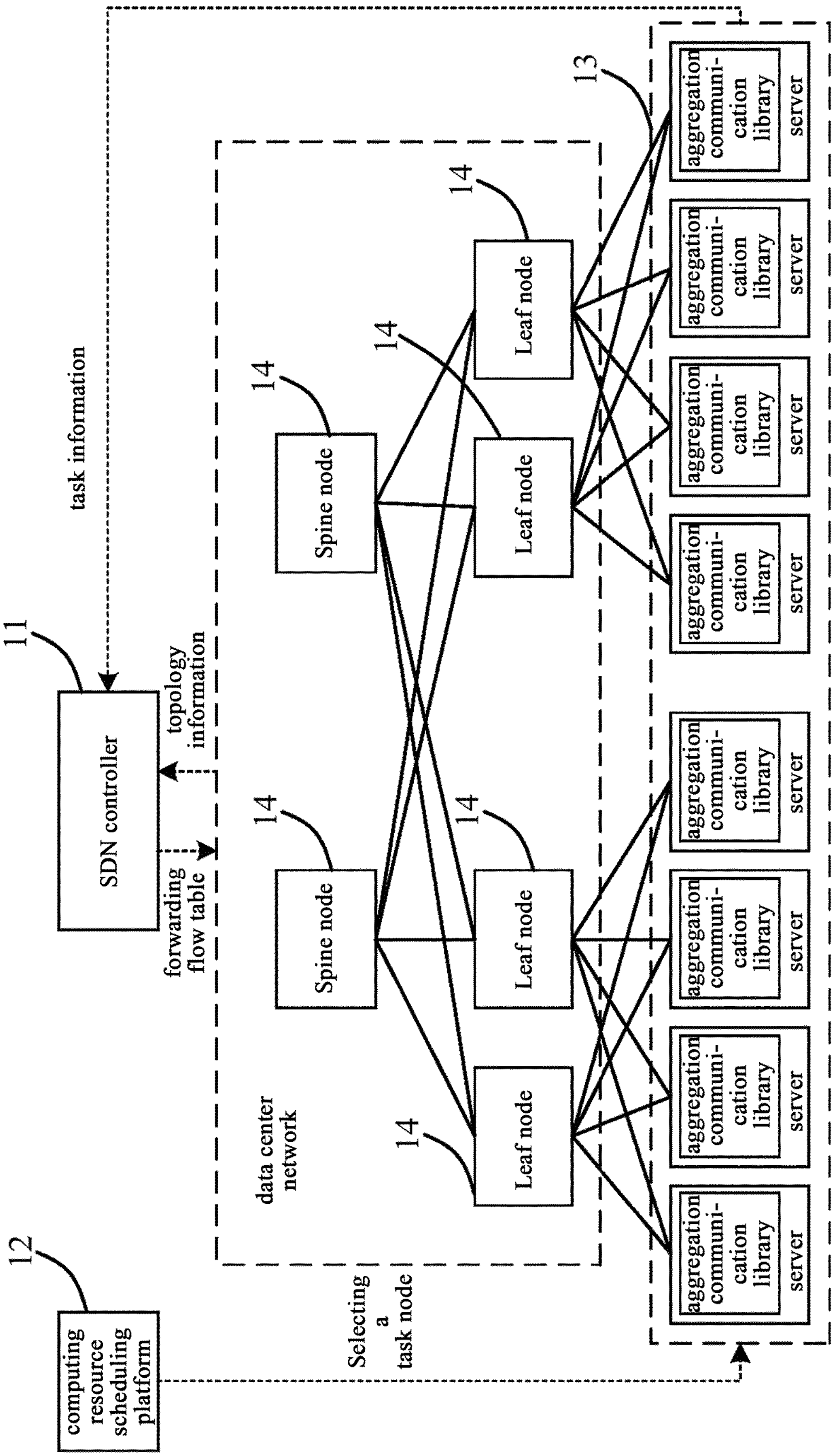
Figure 3C:
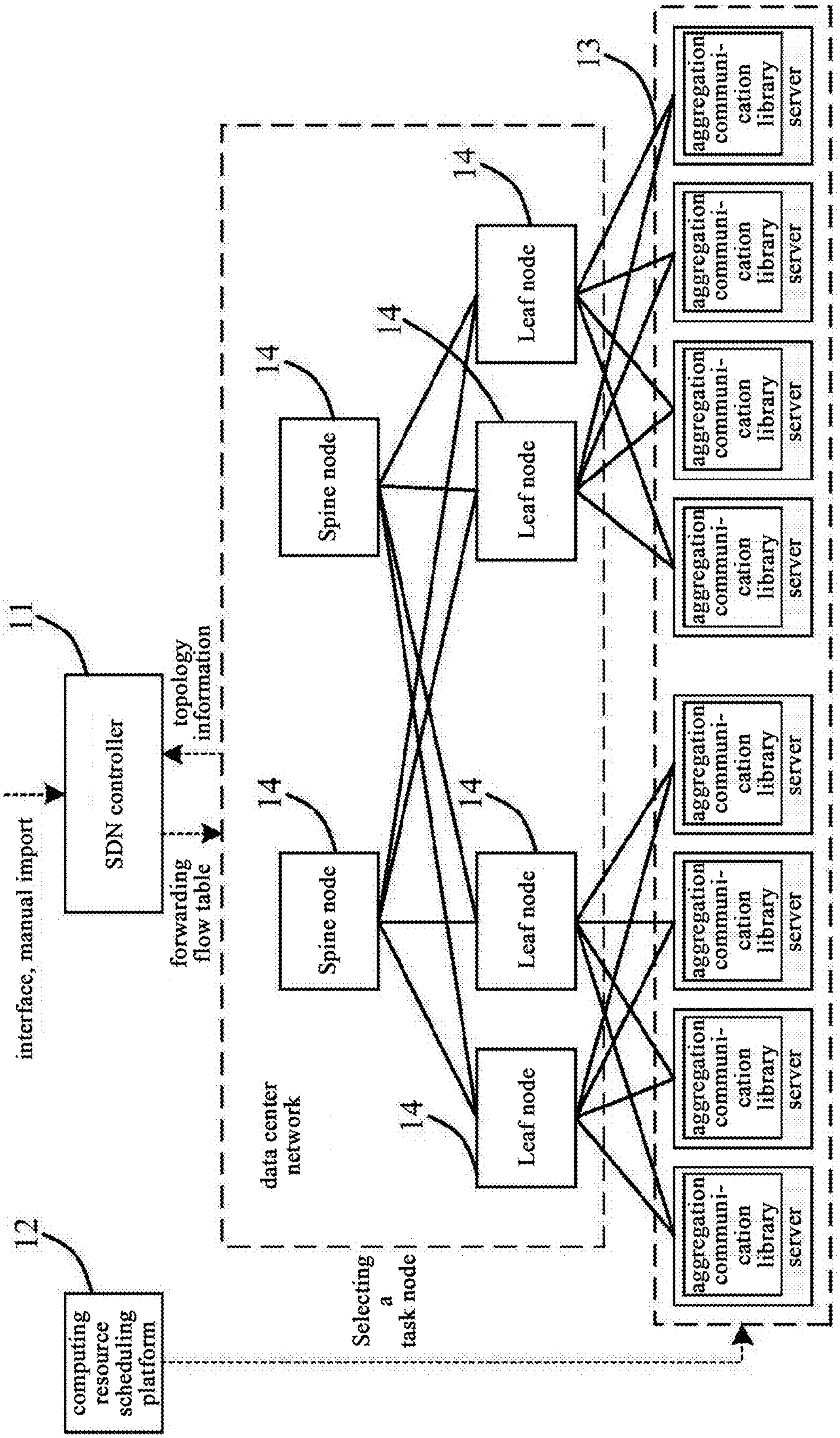
Figure 4:
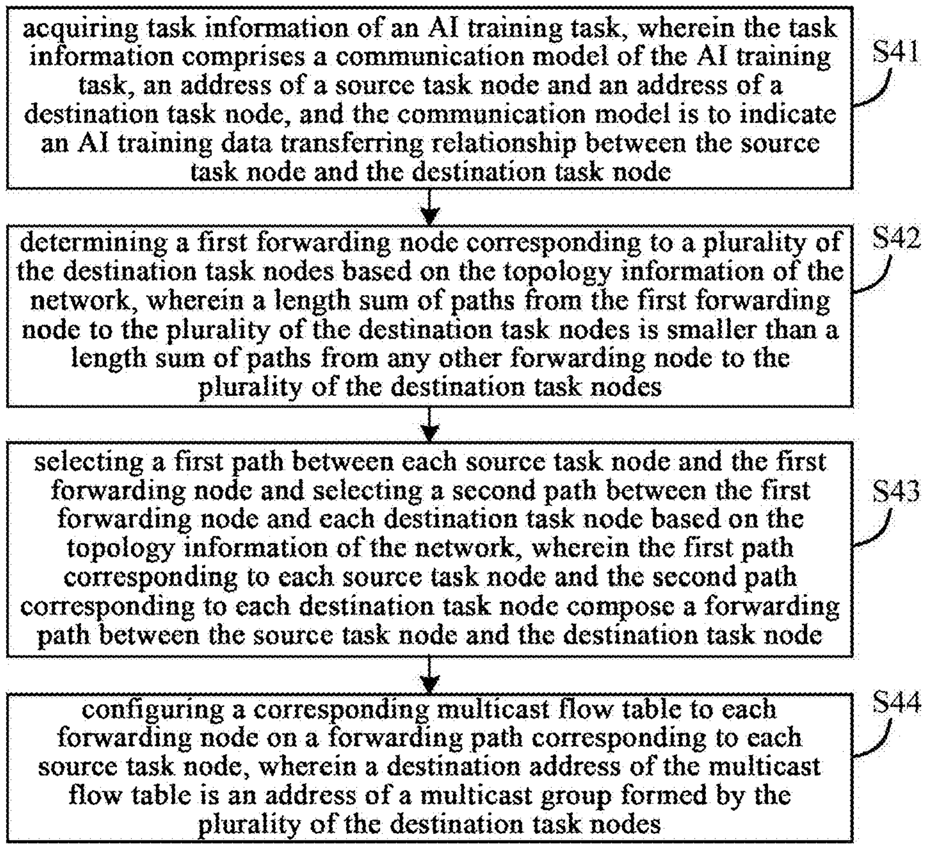
Figure 5:
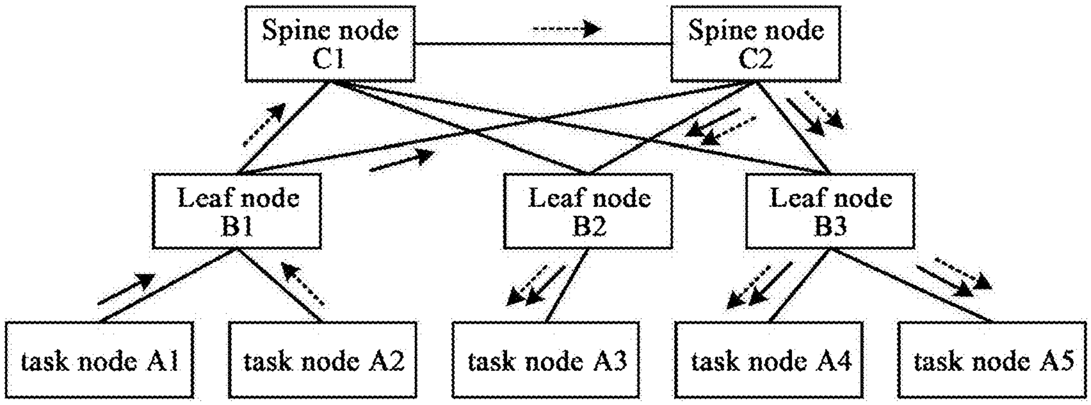
Figure 6:
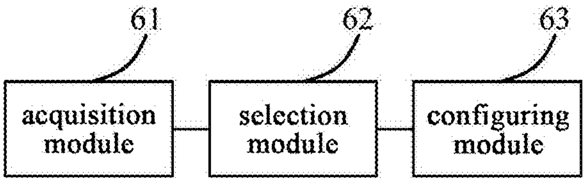
Figure 7:
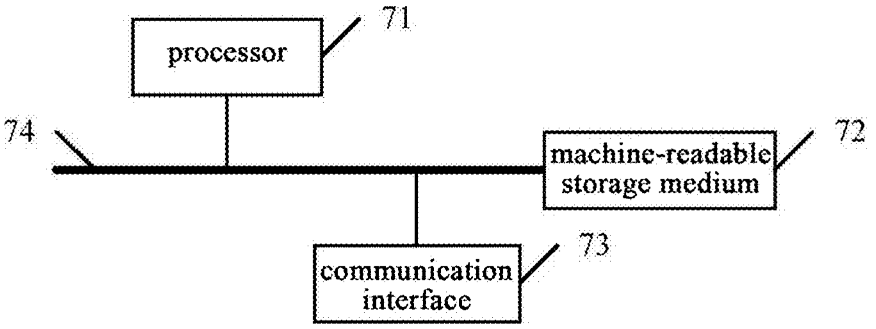

FIG. **3*a*** is a first schematic diagram of an SDN controller acquiring task information provided by an example of the present disclosure;

FIG. 3*b* is a second schematic diagram of the SDN controller acquiring task information provided by an example of the present disclosure;

FIG. 3*c* is a third schematic diagram of the SDN controller acquiring task information provided by an example of the present disclosure;

FIG. 4 is a second schematic process diagram of the method for forwarding a data flow provided by an example of the present disclosure;

FIG. 5 is a second schematic structure diagram of the system for forwarding a data flow provided by an example of the present disclosure;

FIG. 6 is a schematic structure diagram of a device for forwarding a data flow provided by an example of the present disclosure;

FIG. 7 is a schematic structure diagram of an SDN controller provided by an example of the present disclosure.

DETAILED DESCRIPTION

In the following, the technical solutions in the examples of the present disclosure will be clearly and completely described with reference to the drawings in the examples of the present disclosure. Obviously, the described examples are only some, not all, of example of the present disclosure. All other examples obtained by those ordinary skilled in the art based on the examples in the present disclosure fall into the scope of protection of the present disclosure.

For the convenience of understanding, terms in the examples of the present disclosure are explained below.

Artificial Intelligence Data Center (AIDC): a most important computility production center in the age of wisdom. It takes a converged architecture computing system as a platform, takes data as resources, drives an AI model with a powerful computing resource to deeply process the data, and constantly produces various intelligent computing services, which are provided to organizations and individuals in a form of cloud services via the network.

Policy-Based Routing (PBR): a mechanism for routing and forwarding based on policies customized by users. The PBR can perform specified operations, such as setting a next hop, an outgoing interface, a default next hop and a default outgoing interface of packets, on packets that meet certain conditions such as Access Control List (ACL) rules and packet lengths.

OpenFlow flow table: a group of policy entries for a specific flow in an OpenFlow system, which is for searching and forwarding packets.

Task node: a node performing an AI training task of an AI model, for example, a GPU card that performs image processing. At this time, the AI training task can be a task of training image recognition or information search function of the AI model.

Communication model of an AI training task: a communication mode between a source task node and a destination task node of the AI training task, which indicates the AI training data transferring relationship between the source task node and the destination task node, such as a point-to-point transferring relationship, a point-to-multipoint (AllReduce) transferring relationship, a multipoint-to-point (ALL-Together) transferring relationship and a multipoint-to-multipoint (ALL2ALL) transferring relationship, etc. The point-to-point transferring relationship means that one source task node transfers AI training data to one destination task node, the point-to-multipoint transferring relationship means that one source task node transfers AI training data to multiple destination task nodes, the multipoint-to-point transferring relationship means that multiple source task nodes transfer AI training data to one destination task nodes, and the multipoint-to-multipoint transferring relationship means that multiple source task nodes transfer AI training data to multiple destination task nodes. AI training data is data generated when the source task node performs the AI training task.

With the publishing of AI models such as Chat Generative Pre-trained Transformer (ChatGPT) and Generative Pre-trained Transformer (GPT), the demands for Artificial Intelligence Data Centers have increased rapidly, and a new wave of development of AI technology has been set off. At present, there are increasing demands for a large-scale Artificial Intelligence (AI) model training in the industry, which put forward a new requirement for the performance of data center networks supporting basic training. A forwarding node in the data center network forwards the data flow of AI training task by using an existing traffic balance mechanism, which easily leads to a traffic imbalance on the links, and further reduces the network throughput and the performance of AI cluster service is not good.

An existing traffic balance mechanism is generally based on Equal-Cost Multi-Path (ECMP). In the ECMP-based traffic balance mechanism, a forwarding node extracts multi-tuple information of a data flow, performs hash calculation on the multi-tuple information to obtain a next hop node corresponding to the data flow, and sends all packets included in the data flow to the next hop node. In a scene where the number of data flows is relatively large and the traffic of a single data flow is relatively small, the ECMP-based traffic balance mechanism can achieve traffic balance on links. However, in a scene where the number of data flows is relatively small and the traffic of a single data flow is relatively large, it is very likely that all data flows are sent to a same next hop node or a few next hop nodes, leading to traffic imbalance on links, such as full throughput, even congestion and packet loss on some links and unemployment on others. This reduces the network throughput and the performance of AI cluster service is not good.

For example, a data center network includes a plurality of Leaf nodes (such as Leaf node 1 to Leaf node 4) and a plurality of Spine nodes (such as Spine node 1 to Spine node 2), and the data center network further includes a plurality of servers (such as server A to server H). The data center network includes four data flows sent from server A to server E, which are data flow F1-data flow F4, wherein traffic of data flow F1-data flow F3 is relatively large, and traffic of data flow F4 is relatively small. A path group (load sharing link) from server A to server E includes two member links, namely Leaf node 1-Spine node 1-Leaf node 3 and Leaf node 1-Spine node 2-Leaf node 3. After data flow F1-data flow F4 enter Leaf node 1, the Leaf node 1 performs hash calculation on multi-tuple information of the data flow F1-the data flow F4 respectively, and determines that the next hop node corresponding to the data flow F1-the data flow F3 is Spine node 1, and the next hop node corresponding to the data flow F4 is Spine node 2. At this time, the load on Spine node 1 is too heavy, and the load on Spine node 2 is too light, which leads to traffic imbalance on links.

In order to avoid the traffic imbalance in the ECMP-based traffic balance mechanism, a traffic balance mechanism of load sharing packet-by-packet is also proposed in the prior art, in which a forwarding node selects a member link with light load at present for forwarding based on a packet.

For example, a data center network includes forwarding node A and forwarding node B, and a path group (load sharing link) between the forwarding node A and the forwarding node B includes two member links, namely member link 1 and member link 2. The data center network includes data flow F1-data flow F2, wherein the data flow F1 includes packet 1-packet 4, and the data flow F2 includes packet 5. Lengths of packet 1, packet 2, packet 4 and packet 5 are the same, and a length of packet 3 is four times that of packet 1. When data flow F1-data flow F2 enter the forwarding node A, the next hop node corresponding to data flow F1-data flow F2 both are forwarding node B. At this time, the forwarding node A forwards packets included in data flow F1-data flow F2 by using the traffic balance mechanism of load sharing packet-by-packet, in which:

When forwarding node A receives packet 1, member link 1 and member link 2 both have no load, which means that the load of member link 1 and the load of member link 2 are the same, and both are member links with a light load at present. Forwarding node A randomly selects a member link from member link 1 and member link 2 to forward packet 1, for example, selects member link 1 to forward packet 1. When forwarding node A receives packet 2, member link 2 is one with a light load at present, and the forwarding node A selects the member link 2 to forward the packet 2. When the forwarding node A receives packet 3, member link 1 is one with a light load at present, and the forwarding node A selects the member link 1 to forward the packet 3. When the forwarding node A receives packet 4, member link 2 is one with a light load at present, and the forwarding node A selects the member link 2 to forward the packet 4. When the forwarding node A receives packet 5, member link 2 is one with a light load at present, and the forwarding node A selects the member link 2 to forward the packet 5.

The above traffic balance mechanism of load sharing packet-by-packet can solve the problem existing in the above ECMP-based traffic balance mechanism to a certain extent, but a premise of the traffic balance mechanism of load sharing packet-by-packet is that the receiving end can support the function of rearranging packets out of order. In response to that the receiving end cannot support the function of rearranging packets out of order, the traffic balance mechanism of load sharing packet-by-packet cannot be used. However, many existing network devices cannot support the function of rearranging packets out of order, so that the data center network cannot achieve the traffic balance on links.

Figure 1:
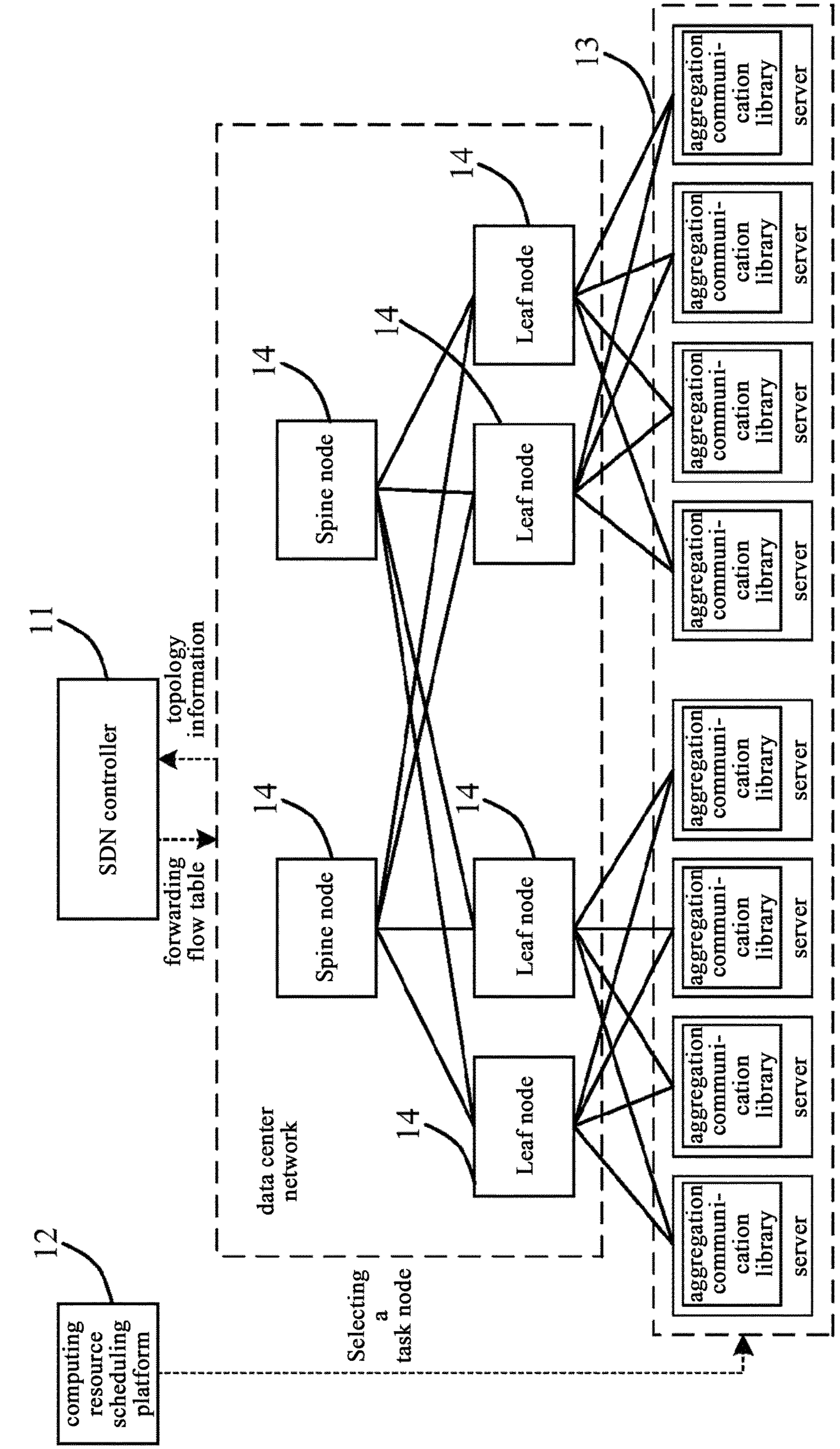
FIG. 1 is a first schematic structure diagram of a system for forwarding a data flow provided by an example of the present disclosure.

In order to achieve the traffic balance on the whole network links, improve the network throughput and improve the performance of AI cluster service, an example of the present disclosure provides a system for forwarding a data flow, as shown in FIG. 1, which includes an SDN controller 11, a computing resource scheduling platform 12, a plurality of servers 13 and a plurality of forwarding nodes 14.

The forwarding node 14 can be a Leaf node or a Spine node, and a plurality of forwarding nodes 14 constitute a data center network.

A plurality of servers 13 access the data center network through Leaf nodes, and one server 13 can be deployed with one or more task nodes, which are nodes performing AI training tasks. For example, the server is a Graphics Processing Unit (GPU) server. A GPU card is a task node, and the GPU server can be deployed with one or more GPU cards. An AI training task is one in which the number of data flows is small but the traffic of a data flow is large, such as the above AI training task.

The computing resource scheduling platform 12 covers and manages a plurality of servers 13, and is responsible for creating an AI training task and selecting a server 13 carrying an AI training task, that is, selecting a task node.

The SDN controller 11 covers and manages the whole data center network, and has a global perspective for network managing and controlling. The SDN controller collects, using telemetry and/or other technologies, topology information of the whole data center network in real time, such as the topology structure, the link state and the utilization rate of link bandwidth, etc., and maintains interconnection information between the server 13 and an accessed forwarding node through the Link Layer Discovery Protocol (LLDP).

In an example of the present disclosure, the SDN controller selects the forwarding path between the source task node and the destination task node in combination with the topology information of the network and the task information of the AI training task, and then configures a forwarding flow table indicating that the data flow of the AI training task is forwarded along the forwarding path. In this way, the forwarding node relies on the forwarding flow table to forward the data flow of the AI training task. Because the SDN controller has a global perspective of network managing and controlling, the SDN controller can select a forwarding path that can achieve load balance to forward the data flow of the AI training task in combination with the topology information of the network and the task information, thus realizing the traffic balance on the whole network links, thus improving the network throughput and improving the performance of AI cluster service.

In addition, in an example of the present disclosure, the traffic balancing process takes an data flow as a unit, and the receiving end does not need to rearrange the packets out of order, which solves the problem that the receiving end needs to support the function of rearranging the packets out of order in the traffic balance mechanism of load sharing packet-by-packet, and expanding the application scope of the examples of the present disclosure.

In addition, the SDN controller 11 has a global perspective of network managing and controlling, and can select a forwarding path achieving traffic balance for the whole network, instead of just achieving traffic balance for a next hop of a single device, which solves the problem that load status of other links at the remote end cannot be perceived and an end-to-end load balance of the whole network is not supported.

Figure 2:
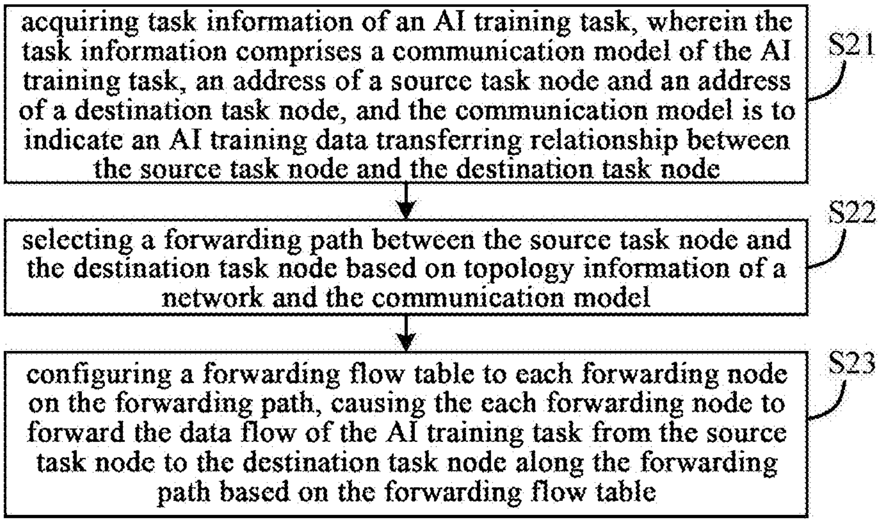
FIG. 2 is a first schematic process diagram of a method for forwarding a data flow provided by an example of the present disclosure.

Based on the above system for forwarding a data flow, an example of the present disclosure further provides a method for forwarding a data flow, as shown in FIG. 2, which is applied to the SDN controller shown in FIG. 1, and includes the following blocks.

Block S21: acquiring task information of an AI training task, wherein the task information includes a communication model of the AI training task, an address of a source task node and an address of a destination task node, and the communication model is to indicate an AI training data transferring relationship between the source task node and the destination task node.

In the example of the present disclosure, the task information is description information of the AI training task, which may include a communication model, an address of a source task node and an address of a destination task node. An Al training task can include one or more data flows, and AI training data carried in data flows sent by one task node is the same, that is, the AI training data that needs to be synchronized to other task nodes by the task node. The source task node is a task node that sends a data flow, and the destination task node is a task node that receives the data flow. An address of the task node can be an Internet Protocol (IP) address. The task information can further include traffic required when the source task node synchronizes data with the destination task node in the AI training task, an IP address of a server where the source task node is located, an IP address of a server where the destination task node is located, and the forwarding path between the source task node and the destination task node, and so on. In an example of the present disclosure, server information such as the IP address of the server where the source task node is located and the IP address of the server where the destination task node is located can also be notified to the SDN controller by a computing resource scheduling platform. For example, after the computing resource scheduling platform creates an AI training task and selects a server that carries the AI training task, the server information is sent to the SDN controller.

In an example of the present disclosure, the SDN controller can acquire task information in any of the following ways:

In a first way, task information is acquired from a computing resource scheduling platform, wherein the task information is information acquired by the computing resource scheduling platform from the server carrying the AI training task, as shown in FIG. 3*a*. An aggregation communication library can be deployed on the server. The aggregation communication library is a library to accelerate communication among multiple GPU cards, which can optimize a forwarding path between GPU cards (that is, the forwarding path between the source task node and the destination task node) and realize aggregation communication and point-to-point communication. The server can obtain task information such as a communication model of the AI training task, an address of a source task node and an address of a destination task node, a forwarding path etc. through an aggregation communication library of the server itself, and then report the task information to the computing resource scheduling platform through the aggregation communication library of the server itself. The computing resource scheduling platform reports the task information to the SDN controller in an active way or a passive way.

In a second way, task information of the AI training task is acquired from a server carrying the AI training task, as shown in FIG. 3*b*. The server can obtain task information such as a communication model of the AI training task, an address of a source task node, an address of a destination task node, a forwarding path etc. through an aggregation communication library of the server itself, and then directly report the task information to the SDN controller through the aggregation communication library of the server itself.

In an example of the present disclosure, the server can be deployed with no aggregation communication library. At this time, for the server, a forwarding path between GPU cards may not be optimized, and a forwarding path between the source task node and the destination task node is not acquired, but only task information such as a communication model of the AI training task, and an address of a source task node and an address of a destination task node is acquired. Accordingly, in the first way and the second way, the server can directly, not through the aggregation communication library, report the task information to the computing resource scheduling platform or the SDN controller.

In a third way: task information is imported manually through a task template based on the SDN controller interface. As shown in FIG. 3*c*, the task template can include information such as a task name, a communication model, an address of a source task node and an address of a destination task node. In an example, the SDN controller displays the control interface of the SDN controller; a user inputs task information of an AI training task to the SDN controller through the control interface, and then the SDN controller receives the task information input from the outside to the SDN controller through the control interface.

In an example of the present disclosure, the SDN controller can also acquire the task information in other ways, which is not limited.

Block S22: selecting a forwarding path between the source task node and the destination task node based on topology information of a network and the communication model.

In an example of the present disclosure, the topology information may include a topology structure, a link state, a utilization rate of link bandwidth, and the like. A link status indicates whether the link is normal.

The SDN controller can determine the number of forwarding paths (such as a first preset number) and the forwarding mode of data flow (such as unicast, multicast or broadcast) required to complete this AI training task in combination with the topology information collected by the SDN controller and the task information of AI training task. For example, when the communication model indicates that the AI training data transferring relationship between the source task node and the destination task node is point-to-multipoint transferring relationship, the number of forwarding paths can be one, and the forwarding mode of the data flow is multicast; when the communication model indicates that the AI training data transferring relationship between the source task node and the destination task node is a multipoint-to-multipoint transferring relationship, the number of forwarding paths can be the number of source task nodes, and the forwarding mode of data flow is multicast.

Based on the topology information, the SDN controller dynamically selects a forwarding path satisfying the requirement of the task information for each pair of task nodes, and a first preset number of forwarding paths is selected in total, thus realizing a flexible and intelligent selection of paths and improving a flexibility forwarding of a data flow.

In an example of the present disclosure, the SDN controller can select the first preset number of forwarding paths in any of the following ways.

In a first way, the SDN controller selects the first preset number of forwarding paths that satisfy the task information and have a lowest load based on the topology structure, the link state and the utilization rate of link bandwidth. In this way, the traffic balance on the whole network links can be better realized.

For example, the SDN controller traverses source task nodes and destination task nodes to obtain a pair of source task node and destination task node, and selects a forwarding path with the lowest load between the source task node and destination task node in the pair based on the topology structure, the link state and the utilization rate of link bandwidth. Then, the SDN controller superimposes traffic required for data synchronization between the source task node and destination task node in the pair on the selected path, and continues to traverse the source task nodes and the destination task nodes to obtain another pair of source task node and destination task node, and selects another forwarding path with the lowest load between the source task node and the destination task node in the another pair based on the topology structure, the link state and the utilization rate of link bandwidth. It is repeated until all the source task nodes and destination task nodes have been traversed.

In an example of the present disclosure, the first way can also be achieved by the SDN controller in other ways, which is not limited.

In a second way, the SDN controller determines the second preset number of forwarding paths with the lowest load from forwarding paths between the source task node and the destination task node, and then selects the first preset number of forwarding paths with the shortest path from the second preset number of forwarding paths. In this way, the traffic balance on the whole network link can be realized, and at the same time, the efficiency of completing the AI training task can be improved.

In an example of the present disclosure, the electronic device can also determine the first preset number of forwarding paths by other ways, such as randomly selecting the first preset number of forwarding paths from the second preset number of forwarding paths, which is not limited.

Block S23: configuring a forwarding flow table to each forwarding node on the forwarding path, causing the each forwarding node to forward the data flow of the AI training task from the source task node to the destination task node along the forwarding path based on the forwarding flow table.

In the example of the present disclosure, the forwarding flow table includes, but is not limited to, a routing table, a PBR table or an OpenFlow flow table. Based on the forwarding mode of the data flow, the forwarding flow tables can be classified into a unicast flow table, a multicast flow table and a broadcast flow table. A source address of the unicast flow table is the address of the source task node, and a destination address of the unicast flow table is the address of the destination task node; a source address of the multicast flow table is the address of the source task node, and a destination address of the multicast flow table is the address of the multicast group, wherein the multicast group is composed of multiple destination task nodes.

After determining the forwarding path, the SDN controller can generate a forwarding flow table, which is to guide a forwarding of the data flow of the AI training task. The SDN controller configures the generated forwarding flow table to each forwarding node on the forwarding path. In this way, each forwarding node forwards the data flow of the AI training task based on the forwarding flow table, so that the data flow of the Al training task is forwarded from the source task node to the destination task node along the forwarding path.

In the technical solutions provided by the examples of the present disclosure, the SDN controller selects the forwarding path between the source task node and the destination task node in combination with the topology information of the network and the task information of the AI training task, and then configures a forwarding flow table indicating that the data flow of the AI training task is forwarded along the forwarding path. In this way, the forwarding node relies on the forwarding flow table to forward the data flow of the AI training task. Because the SDN controller has a global perspective of network managing and controlling, the SDN controller can select a forwarding path that can achieve load balance to forward the data flow of the AI training task in combination the topology information of the network and the task information, thus realizing the traffic balance on the whole network links, thus improving the network throughput and improving the performance of AI cluster service.

In some examples, the AI training data transferring relationship between the source task node and the destination task node is point-to-multipoint transferring relationship, or the AI training data transferring relationship between the source task node and the destination task node is a multipoint-to-multipoint transferring relationship. In this case, an example of the present disclosure further provides a method for forwarding a data flow, as shown in FIG. 4, which is applied to the SDN controller shown in FIG. 1, and may include the following blocks.

Block S41: acquiring task information of an AI training task, wherein the task information includes a communication model of the AI training task, an address of a source task node and an address of a destination task node, and the communication model is to indicate an AI training data transferring relationship between the source task node and the destination task node. It is the same as the above block S21.

Block S42: determining a first forwarding node corresponding to a plurality of the destination task nodes based on the topology information of the network, wherein a length sum of paths from the first forwarding node to the plurality of the destination task nodes is smaller than a length sum of paths from any other forwarding node to the plurality of the destination task nodes.

In an example of the present disclosure, the first forwarding node is a forwarding node in a data center network, and a length sum of paths from the first forwarding node, compared with other forwarding nodes, to the plurality of destination task nodes is the smallest.

After acquiring the task information, the SDN controller can determine the first forwarding nodes corresponding to the plurality of destination task nodes from a global perspective based on the topology information of the network.

Block S43: selecting a first path between each source task node and the first forwarding node and selecting a second path between the first forwarding node and each destination task node based on the topology information of the network, wherein the first path corresponding to each source task node and the second path corresponding to each destination task node compose a forwarding path between the source task node and the destination task node.

There may be one or more paths between one source task node and the first forwarding node, and one or more paths between one destination task node and the first forwarding node. After the first forwarding node is determined, for each source task node, the SDN controller can select a path, such as the first path, between the source task node and the first forwarding node from a global perspective based on the topology information of the network. In addition, for each destination task node, the SDN controller can select a path, such as the second path, between the first forwarding node and the destination task node from a global perspective based on the topology information of the network. The first path corresponding to one source task node and the second path corresponding to one destination task node constitute the forwarding path between this source task node and this destination task node.

In this case, forwarding paths between a source task node and a plurality of destination task nodes all include the first path, that is, the first path is a common path between the source task node and the plurality of destination task nodes.

Block S44: configuring a corresponding multicast flow table to each forwarding node on a forwarding path corresponding to each source task node, wherein a destination address of the multicast flow table is an address of a multicast group formed by the plurality of the destination task nodes.

In the example of the present disclosure, the forwarding path corresponding to each source task node includes forwarding paths between the source task node and a plurality of destination task nodes. After determining the forwarding path corresponding to each source task node, the SDN controller can generate a multicast flow table corresponding to each source task node from a multicast group composed of a plurality of destination task nodes, wherein the multicast flow table corresponding to each source task node is to guide the data flow sent by the source task node to be multicasted to the plurality of destination task nodes.

For example, the system for forwarding a data flow shown in FIG. 5 includes an SDN controller, task node A1-task node A5, Leaf node B1-Leaf node B3, and Spine node C1-Spine node C2. Connection relationships of the task nodes, the Leaf nodes and the Spine nodes are shown as connection lines in FIG. 5. The task information acquired by the SDN controller indicates that the AI training data transferring relationship between the source task node and the destination task node is a multipoint-to-multipoint transferring relationship. In an example, task node A1-task node A2 are source task nodes, and task node A3-task node A5 are destination task nodes. The SDN controller regards task node A3 to task node A5 as multicast group 1. Based on the topology information of the network, the SDN controller can determine that the first forwarding node corresponding to the task node A3-the task node A5 is Spine node C2.

For task node A1, the SDN controller can select task node A1-Leaf node B1-Spine node C2, namely, path 1, as a first path corresponding to the task node A1 based on the topology information of the network. For task node A2, the SDN controller can select task node A2-Leaf node B1-Spine node C1-Spine node C2, namely, path 2, as a first path corresponding to the task node A2 based on the topology information of the network.

For task node A3, the SDN controller can select Spine node C2-Leaf node B2-task node A3, namely, path 3, as a second path corresponding to the task node A3 based on the topology information of the network. For task node A4, the SDN controller can select Spine node C2-Leaf node B3-task node A4, namely, path 4, as a second path corresponding to the task node A5 based on the topology information of the network. For task node A5, the SDN controller can select Spine node C2-Leaf node B3-task node A5, namely, path 5, as a second path corresponding to the task node A5 based on the topology information of the network.

The SDN controller generates multicast flow table 1 corresponding to the task node A1 based on the path 1 and path 3-path 5, wherein a source address of the multicast flow table 1 is an address of the task node A1, and a destination address of the multicast flow table 1 is an address of the multicast group 1. The SDN controller configures the multicast flow table 1 to the Leaf node B1-the Leaf node B3 and the Spine node C2. At this time, the task node A1 only needs to send one data flow 1 (as shown by the solid arrow in FIG. 5), and the Leaf node B1-the Leaf node B3 and the Spine node C2 can forward the data flow 1 to the task node A3-task node A5 based on the multicast flow table 1, thus data of the task node Al is synchronized to the task node A3-the task node A5.

The SDN controller generates multicast flow table 2 corresponding to the task node A2 based on the path 2 and path 3-path 5, wherein a source address of the multicast flow table 2 is an address of the task node A2, and a destination address of the multicast flow table 2 is an address of the multicast group 1. The SDN controller configures the multicast flow table 2 to the Leaf node B1-the Leaf node B3 and the Spine node C1-Spine node C2. At this time, the task node A2 only needs to send one data flow 2 (as shown by the dashed arrow in FIG. 5), and the Leaf node B1-the Leaf node B3 and the Spine node C1-the Spine node C2 can forward the data flow 2 to the task node A3-task node A5 based on the multicast flow table 2, thus the data of the task node A2 is synchronized to the task node A3-the task node A5.

In the example of the present disclosure, in view of a point-to-multipoint relationship or multipoint-to-multipoint relationship of the communication model, the SDN controller constructs and configures a multicast flow table. In this case, the data that needs to be synchronized to a destination task node can be synchronized by multicasting to all destination task nodes as long as one source task node constructs one data flow, instead of constructing a data flow for each destination task node separately for the purpose of data synchronization. This greatly reduces the load on the network.

In some examples, in order to further improve the traffic balance on the whole network links, the above block S43 may be: based on the topology structure, the link state and the utilization rate of link bandwidth, selecting the first path with a lowest load between each source task node and the first forwarding node, and selecting the second path with a lowest load between the first forwarding node and each destination task node.

Taking FIG. 5 as an example, task node A1-task node A2 are source task nodes, task node A3 to task node A5 are destination task nodes, and Spine node C2 is a first forwarding node.

For task node A1, there are two paths between the task node A1 and the Spine node C2, which are: task node A1-Leaf node B1-Spine node C2, namely, path 1, and task node A1-Leaf node B1-Spine node C1-Spine node C2, namely, path 11. The load of the path 1 is lower than that of path 11, so the SDN controller selects the path 1 as a first path corresponding to the task node A1.

For task node A2, there are two paths between the task node A2 and the Spine node C2, they are: task node A2-Leaf node B1-Spine node C2, namely, path 2, and the task node A2-Leaf node B1-Spine node C1-Spine node C2, namely, path 21. After the traffic of the task node Al is superimposed on the path 21, the load of the path 2 is lower than that of the path 21, so the SDN controller selects the path 2 as a first path corresponding to the task node A2.

Similarly, the SDN controller selects the second path corresponding to the task node A3 to the task node A5.

By adopting the examples of the present disclosure, the SDN controller assigns a forwarding path with the lowest network load for the AI training task, thus further improving the traffic balance on the whole network links.

Corresponding to the above method for forwarding a data flow, an example of the present disclosure further provides a device for forwarding a data flow, as shown in FIG. 6, which is applied to an SDN controller, and the device includes:

- an acquisition module 61, to acquire task information of an AI training task, wherein the task information includes a communication model of the AI training task, an address of a source task node and an address of a destination task node, and the communication model is to indicate an AI training data transferring relationship between the source task node and the destination task node;
- a selection module 62, to select a forwarding path between the source task node and the destination task node based on topology information of a network and the communication model;
- a configuring module 63, to configure a forwarding flow table to each forwarding node on the forwarding path, causing each forwarding node to forward a data flow of the AI training task from the source task node to the destination task node along the forwarding path based on the forwarding flow table.

In some examples, the acquisition module 61 can be to:

acquire the task information of the AI training task from a computing resource scheduling platform, wherein the task information is information acquired by the computing resource scheduling platform from a server carrying the AI training task, and the server includes one or more task nodes therein; or acquire the task information of the AI training task from a server carrying the AI training task, wherein the server includes one or more task nodes therein; or display a control interface of the SDN controller; receive task information of the AI training task which is input from outside to the SDN controller via the control interface.

In some examples, the AI training data transferring relationship between the source task node and the destination task node is a point-to-multipoint transferring relationship, or, the AI training data transferring relationship between the source task node and the destination task node is a multipoint-to-multipoint transferring relationship;

the selection module 62 can be to:

determine a first forwarding node corresponding to a plurality of the destination task nodes based on the topology information of the network, wherein a length sum of paths from the first forwarding node to the plurality of the destination task nodes is smaller than a length sum of paths from any other forwarding node to the plurality of the destination task nodes;

select a first path between each source task node and the first forwarding node and selecting a second path between the first forwarding node and each destination task node based on the topology information of the network, wherein the first path corresponding to each source task node and the second path corresponding to each destination task node compose a forwarding path between this source task node and this destination task node;

the configuring module 63 can be to:

configure a corresponding multicast flow table to each forwarding node on a forwarding path corresponding to each source task node, wherein a destination address of the multicast flow table is an address of a multicast group formed by the plurality of the destination task nodes.

In some examples, the topology information includes a topology structure, a link state and a utilization rate of link bandwidth;

the selection module 62 can be to select, based on the topology structure, the link state and the utilization rate of link bandwidth, the first path with a lowest load between each source task node and the first forwarding node, and select the second path with a lowest load between the first forwarding node and each destination task node.

In some examples, the device for forwarding a data flow may further include:

a collection module, to collect the topology information of the network in real time by using a telemetry technology.

In some examples, the forwarding flow table is a routing table, a policy routing table or an OpenFlow flow table.

In the technical solutions provided by the examples of the present disclosure, the SDN controller selects the forwarding path between the source task node and the destination task node in combination with the topology information of the network and the task information of the AI training task, and then configures a forwarding flow table indicating that the data flow of the AI training task is forwarded along the forwarding path. In this way, the forwarding node relies on the forwarding flow table to forward the data flow of the AI training task. Because the SDN controller has a global perspective of network managing and controlling, the SDN controller can select a forwarding path that can achieve load balance to forward the data flow of the AI training task by combining the topology information of the network and the task information, thus realizing the traffic balance on the whole network links, thus improving the network throughput and improving the performance of AI cluster service.

Corresponding to the above method for forwarding a data flow, an example of the present disclosure further provides an SDN controller, as shown in FIG. 7, which includes a processor 71 and a machine-readable storage medium 72 having a machine-executable instruction stored therein that can be executed by the processor 71, wherein the machine-executable instruction causes the processor 71 to carry out any of the above methods for forwarding a data flow.

In some examples, as shown in FIG. 7, the SDN controller may further include a communication interface 73 and a communication bus 74, wherein the processor 71, the communication interface 73 and the machine-readable storage medium 72 communicate with each other via the communication bus 74.

The communication bus can be a Peripheral Component Interconnect (PCI) bus or an Extended Industry Standard Architecture (EISA) bus, etc. The communication bus can be categorized into an address bus, a data bus and a control bus. For ease of representation, it is only represented by a thick line in the figure, but it does not mean that there is only one bus or one type of bus.

The communication interface is for communication between the SDN controller and other devices.

The machine-readable storage medium may include a Random Access Memory (RAM) or a Non-Volatile Memory (NVM), such as at least one disk memory. Alternatively, the machine-readable storage medium may also be at least one storage device located away from the aforementioned processor.

The processor can be a general-purpose processor, including a Central Processing Unit (CPU) and a Network Processor (NP). It can also be a Digital Signal Processor (DSP), an application specific integrated circuit (ASIC), a Field-Programmable Gate Array (FPGA) or other programmable logic devices, discrete gate or transistor logic devices, and discrete hardware components.

Corresponding to the above method for forwarding a data flow, in another example provided by the present disclosure, a computer-readable storage medium is further provided, which has a computer program stored therein, wherein the computer program, when executed by a processor, carries out any one of the above methods for forwarding a data flow.

Corresponding to the above method for forwarding a data flow, in yet another example provided by the present disclosure, a computer program product is further provided, which contains an instruction therein, wherein the instruction, when runs on a computer, causes the computer to carry out any one of the above methods for forwarding a data flow.

The above examples can be realized in whole or in part by software, hardware, firmware or any combination thereof. When implemented by software, it can be fully or partially implemented in the form of a computer program product. The computer program product includes one or more computer instructions. When the computer program instructions are loaded and executed on a computer, the flow or function described in the examples of the present disclosure is generated in whole or in part. The computer can be a general-purpose computer, a dedicated computer, a computer network, or other programmable devices. The computer instructions can be stored in a computer-readable storage medium or transmitted from a computer-readable storage medium to another. For example, the computer instructions can be transmitted from a website, computer, server or data center to another website, computer, server or data center by wire (such as coaxial cable, optical fiber, digital subscriber line (DSL)) or wirelessly (such as infrared, wireless, microwave, or the like). The computer-readable storage medium can be any available medium that a computer can access or a data storage device such as a server, a data center and the like that contains one or more available media. The available medium may be a magnetic medium (e.g., a floppy disk, a hard disk, a magnetic tape), an optical medium (e.g., DVD), or a semiconductor medium (e.g., a Solid State Disk (SSD)) and the like.

It should be noted that in the present disclosure, relational terms such as first and second are only to distinguish one entity or operation from another entity or operation, and do not necessarily require or imply that there is any such actual relationship or order between these entities or operations. Moreover, the terms "including", "comprising" or any other variation thereof are intended to cover non-exclusive inclusion, so that a process, method, article or device including a series of elements includes not only those elements, but also other elements not explicitly listed or elements inherent to such process, method, article or device. Without further restrictions, an element defined by the phrase "including one . . . " does not exclude the existence of other identical elements in the process, method, article or device including the element.

Each example in this specification is described in a related way, and the same and similar parts between the examples can be referred to each other, and each example focuses on the differences from other examples. Especially, regarding the examples of the device, SDN controller, storage medium and program product, the description thereof is relatively simple since they are basically similar to the examples of the method, and the relevant points can be referred to the part of description of the examples of the method.

The above is only the preferred examples of the present disclosure, and are not used to limit the present disclosure. Any modification, equivalent substitution, improvement, etc. made within the spirit and principle of the present disclosure should be included in the scope of protection of the present disclosure.

The invention claimed is:

1. A method for forwarding a data flow, applied to a Software Defined Network (SDN) controller, the method comprising:

acquiring task information of an AI training task, wherein the task information comprises a communication model of the AI training task, an address of a source task node and an address of a destination task node, and the communication model is to indicate an AI training data transferring relationship between the source task node and the destination task node;

selecting a forwarding path between the source task node and the destination task node based on topology information of a network and the communication model;

configuring a forwarding flow table to each forwarding node on the forwarding path, causing the each forwarding node to forward a data flow of the AI training task from the source task node to the destination task node along the forwarding path based on the forwarding flow table, wherein the AI training data transferring relationship between the source task node and the destination task node is a point-to-multipoint transferring relationship, or, the AI training data transferring relationship between the source task node and the destination task node is a multipoint-to-multipoint transferring relationship;

selecting the forwarding path between the source task node and the destination task node based on the topology information of the network and the communication model, comprises:

determining a first forwarding node corresponding to a plurality of the destination task nodes based on the topology information of the network, wherein a length sum of paths from the first forwarding node to the plurality of the destination task nodes is smaller than a length sum of paths from any other forwarding node to the plurality of the destination task nodes;

selecting a first path between each source task node and the first forwarding node and selecting a second path between the first forwarding node and each destination task node based on the topology information of the network, wherein the first path corresponding to each source task node and the second path corresponding to each destination task node compose a forwarding path between this source task node and this destination task node;

configuring the forwarding flow table to each forwarding node on the forwarding path, comprises:

configuring a corresponding multicast flow table to each forwarding node on a forwarding path corresponding to each source task node, wherein a destination address of the multicast flow table is an address of a multicast group formed by the plurality of the destination task nodes.

2. The method according to claim 1, wherein acquiring the task information of the AI training task comprises:

acquiring the task information of the AI training task from a computing resource scheduling platform, wherein the task information is information acquired by the computing resource scheduling platform from a server carrying the AI training task, and the server comprises one or more task nodes therein; or acquiring the task information of the AI training task from a server carrying the AI training task, wherein the server comprises one or more task nodes therein; or displaying a control interface of the SDN controller; receiving the task information of the AI training task which is input from outside to the SDN controller via the control interface.

3. The method according to claim 1, wherein the topology information comprises a topology structure, a link state and a utilization rate of link bandwidth;

selecting the first path between each source task node and the first forwarding node and selecting the second path between the first forwarding node and each destination task node based on the topology information of the network, comprises:

selecting, based on the topology structure, the link state and the utilization rate of link bandwidth, the first path with a lowest load between each source task node and the first forwarding node, and selecting the second path with a lowest load between the first forwarding node and each destination task node.

4. The method according to claim 1, further comprising: collecting the topology information of the network in real time by using a telemetry technology.

5. The method according to claim 1, wherein the forwarding flow table is a routing table, a policy routing table or an OpenFlow flow table.

6. A device for forwarding a data flow, applied to a Software Defined Network (SDN) controller, the device comprising:

a memory that stores executable modules; and a processor coupled to the memory, that executes and facilitates execution of the executable modules, the processor comprising:

an acquisition module, to acquire task information of an AI training task, wherein the task information comprises a communication model of the AI training task, an address of a source task node and an address of a destination task node, and the communication model is to indicate an AI training data transferring relationship between the source task node and the destination task node;

a selection module, to select a forwarding path between the source task node and the destination task node based on topology information of a network and the communication model;

a configuring module, to configure a forwarding flow table to each forwarding node on the forwarding path, causing each forwarding node to forward a data flow of the AI training task from the source task node to the destination task node along the forwarding path based on the forwarding flow table, wherein the AI training data transferring relationship between the source task node and the destination task node is a point-to-multipoint transferring relationship, or, the AI training data transferring relationship between the source task node and the destination task node is a multipoint-to-multipoint transferring relationship;

the selection module is to:

determine a first forwarding node corresponding to a plurality of the destination task nodes based on the topology information of the network, wherein a length sum of paths from the first forwarding node to the plurality of the destination task nodes is smaller than a length sum of paths from any other forwarding node to the plurality of the destination task nodes;

select a first path between each source task node and the first forwarding node and selecting a second path between the first forwarding node and each destination task node based on the topology information of the network. wherein the first path corresponding to each source task node and the second path corresponding to each destination task node compose a forwarding path between this source task node and this destination task node;

the configuring module is to:

configure a corresponding multicast flow table to each forwarding node on a forwarding path corresponding to each source task node, wherein a destination address of the multicast flow table is an address of a multicast group formed by the plurality of the destination task nodes.

7. The device according to claim 6, wherein the acquisition module is to:

acquire the task information of the AI training task from a computing resource scheduling platform, wherein the task information is information acquired by the computing resource scheduling platform from a server carrying the AI training task, and the server comprises one or more task nodes therein; or acquire the task information of the AI training task from a server carrying the AI training task, wherein the server comprises one or more task nodes therein; or display a control interface of the SDN controller; receive the task information of the AI training task which is input from outside to the SDN controller via the control interface.

8. The device according to claim 6, wherein the topology information comprises a topology structure, a link state and a utilization rate of link bandwidth;

the selection module is to select, based on the topology structure, the link state and the utilization rate of link bandwidth, the first path with a lowest load between each source task node and the first forwarding node, and select the second path with a lowest load between the first forwarding node and each destination task node.

9. The device according to claim 6, wherein the device further comprises:

a collection module, to collect the topology information of the network in real time by using a telemetry technology.

10. The device according to claim 6, wherein the forwarding flow table is a routing table, a policy routing table or an OpenFlow flow table.

11. A Software Defined Network (SDN) controller, comprising a processor and a machine-readable storage medium having a machine-executable instruction stored therein that can be executed by the processor, wherein the machine-executable instruction causes the processor to carry out the method according to claim 1.

12. A non-transitory computer-readable storage medium having a computer program stored therein, wherein the computer program, when executed by a processor, carries out the method according to claim 1.

* * * * *